June 16, 1936.  E. C. BRODIN  2,044,663
CAGE FOR ANTIFRICTION BEARINGS
Filed Feb. 7, 1935   2 Sheets-Sheet 1

INVENTOR
Eric C. Brodin
BY
his ATTORNEY

June 16, 1936.  E. C. BRODIN  2,044,663

CAGE FOR ANTIFRICTION BEARINGS

Filed Feb. 7, 1935  2 Sheets-Sheet 2

INVENTOR
Eric C. Brodin
BY
his ATTORNEY

Patented June 16, 1936

2,044,663

UNITED STATES PATENT OFFICE 2,044,663

CAGE FOR ANTIFRICTION BEARINGS

Eric C. Brodin, Jenkintown, Pa., assignor to S K F Industries, Inc., Philadelphia, Pa., a corporation of Delaware Application February 7, 1935, Serial No. 5,318

6 Claims. (Cl. 308—217)

My invention relates to improvements in cages for anti-friction bearings and has for an object to provide an improved form of construction for snap cages for anti-friction bearings and particularly to provide a cage which has pockets for the rolling elements, preferably rollers, which are so formed that when the cage is in position on one of the races, the rolling elements may be forced into radially disposed pockets and when in the pockets will be there retained, yet free to rotate. The cage, the rollers, and the race ring provided with shoulders or lands serving to hold one another in position as a self-contained handling unit.

Another object of the invention is to form the pockets of a cage of this character so that they are larger than the ball or roller diameter at the side which is adjacent to the ring, the opening at the outer or free side being sufficiently smaller than the roller or ball diameter that these rolling elements may be readily either forced or snapped into the pockets.

Another object of the invention is to form a roller bearing cage in one single part or piece. This feature is desirable in making cages of thick material and one object of the invention being the avoidance of making such a roller bearing cage in two parts fastened together.

Another object of the invention is to provide surfaces within the pockets disposed away from the "holding-in" surfaces for receiving the normal wear thereby preserving the holding-in or snapping-in feature.

Another object of the invention is to provide a cage in which the rolling element is forced into the pocket, a slight amount of force being required and the roller may snap into position if it is desired to so organize the construction.

The drawings accompanying this specification are for the purpose of illustrating my invention in connection with the accompanying description in which drawings—

Figure 1:
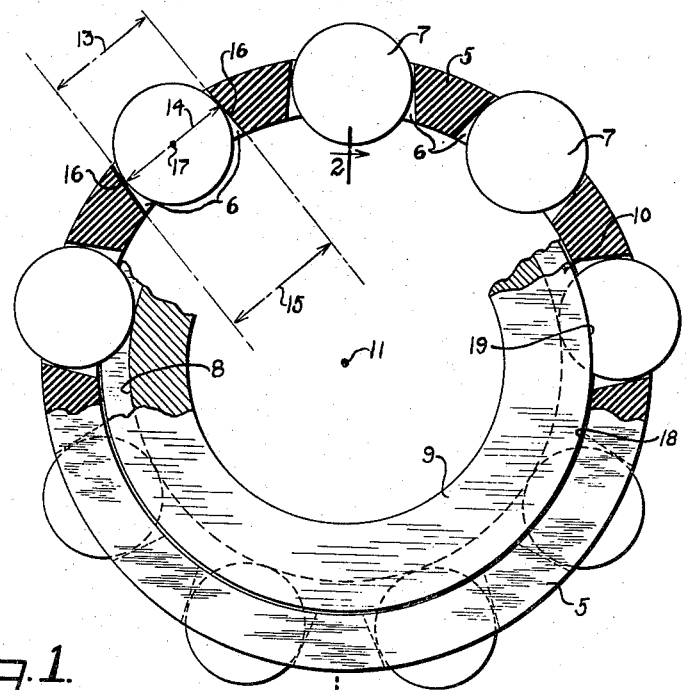
Figure 1 is a section through a portion of a roller bearing equipped with my improved cage, the rollers and cage being assembled on the inner ring of the bearing.
Figure 2:
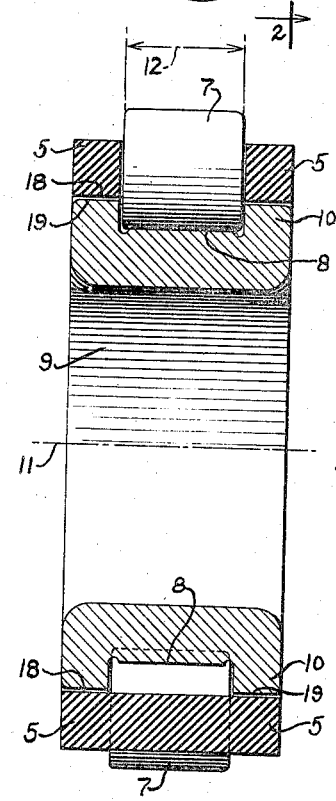
Figure 2 is a section through the same parts taken at about the plane of the line 2—2 of Figure 1 and Figures 3 and 4 are similar sections showing the rollers and cage mounted in the outer ring of a bearing.

In making a cage according to my invention, I preferably form it, if it is for use in a roller bearing, as a hollow cylinder or a short section of tubing through which is formed a number of pockets equal to the number of rollers which are to be used in the bearing. In Figures 1 and 2 the cage is designated by the reference character 5, the pockets being designated by the reference character 6. The rollers 7 are shown as square section rollers, that is the diameter of the roller is substantially the same as its length. These rollers in Figure 1 run in or upon a raceway 8 which is located between the shoulders on the outer perimeter of the inner ring 9 formed by the lands or flanges 10. The bearing center is represented at 11. In this illustrated form of the invention it is assumed that the outer race ring shall either be a plane cylindrical structure or that it have that form and one land or flange only at one side of its raceway.

The lateral plane surfaces 16 of the roller pocket 6, are inwardly diverging toward the raceway surface of the ring 9, it being a square hole with two tapered sides, the sides converging outwardly. In this manner a roller pocket of simplest form is created, one which is capable of holding the rollers from dropping out yet eliminating the need for lateral displacement of cage material after the roller is placed in the pocket.

The dimension of the pockets 6 in the direction axially of the rollers is sufficient to give free clearance and running movement. This dimension is indicated by the reference character 12. The other dimension of the pocket at its opening or mouth which is the side away from the race ring 9, is the chord indicated by the dotted line 13 which is shorter than is the maximum diameter of the roller 14. The inner or raceward side of the opening is formed on a chord 15 which is much larger than the diameter of the roller. The contacting faces 16 are illustrated as plane. The general appearance of each of the pockets is preferably as shown in Figure 1, the side faces 16 being shown symmetrical to a radial plane passing from the center 11 of the bearing thru the center 17 of the roller in such pocket. In some instances it may be found desirable to form one side of the pocket parallel with this radial plane.

Various materials may be employed for the manufacture of this cage, certain bronzes or brasses being acceptable. Other non-metallic material can be used since one of the objects of this invention is to be able to form cages from some non-metallic substance or material which is light. A material which I have used successfully is Formica. Another with which I have experimented is Micarta.

When it is desired to assemble the cage, rollers and inner race ring in Figures 1 and 2, the operator passes the cage over one of the lands 10 and into a position above the raceway 8 and then forces or snaps the rollers into position through the smaller and outwardly disposed openings of the pockets. The roller snaps past the restricted opening and then is freely received in the body of the pocket and between the shoulder forming flanges or lands 10.

By regulating the distance apart of the faces or walls 16—16 of the pocket in relation to the diameter of the roller, the manufacturer can determine whether the cage shall be a land riding cage, that is whether its inner perimeter 18 shall ride upon the outer perimeters 19 of the lands or flanges 10 or whether the cage shall be a roller riding cage, that is wherein the faces or walls 16—16 of the pockets ride upon the rollers and hold the cage surface 18 out of contact with the race ring surface 19, or these dimensions may be so nicely adjusted that the cage will practically be supported upon a film of lubricant between the cage wall 16—16 and the roller and the faces 18 of the cage and 19 of the lands in which case the cage can be assumed to be riding upon both the rollers and the lands, the actual carrying out of which assumption, depending from time to time upon the particular load within the bearing incident to its use.

My cage does not, as in previous designs, place the normal wear on the holding-in surfaces because it provides surfaces within the pockets disposed away from the holding-in surfaces for receiving the normal wear. The holding-in surfaces of the cage which are located at the mouth are disposed at a sufficient distance from the normal working positions of the rollers within the pockets to be free of the rollers during the working or running of the bearing, when the rollers in the cage pockets are in rolling engagement with the raceway surface of the ring with which they are assembled. The rollers, of course, when doing their real work, other than holding themselves and the cage in unit assembly with one of the rings and between the shoulders at the sides of its raceway, are in rolling engagement or contact with some raceway surface, not shown in the drawings. This latter raceway surface probably conforms to the contour of the rollers and in the forms illustrated is most conveniently cylindrical. The assembled contact of such raceway with the rollers holds them in proper rolling engagement with the other raceway surface and out of engagement with the holding-in portions or surfaces of the cage. The advantage of holding the rollers away from these surfaces is that they do not wear away and are in condition to hold the rollers in their pockets whenever the free ring is removed from within the unit assembly.

Figure 3:
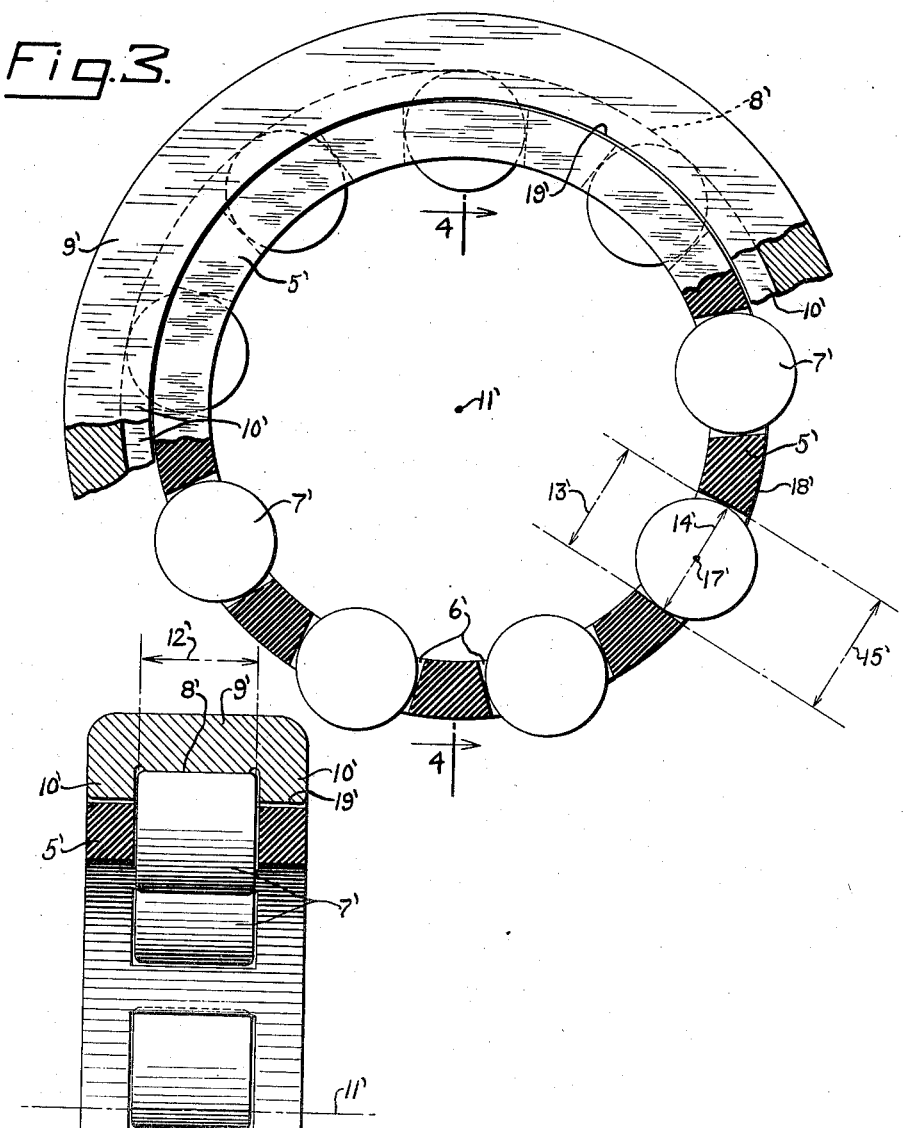
Figure 4:
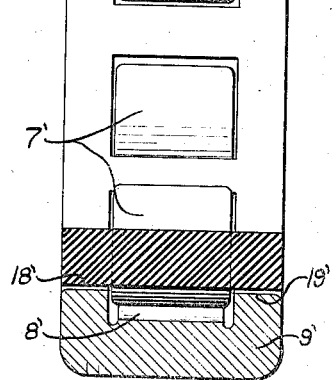

In the form of my invention illustrated in Figures 3 and 4 the rollers 7' run in raceways 8' formed in the outer race ring 9' of the roller bearing. In this illustrated form of the invention it is assumed that the inner race ring shall either be a plane cylindrical structure or that it have that form and one land or flange only at one side of its raceway.

The lands or flanges which present shoulders for the ends of the rollers are indicated by the reference character 10'. The cage 5' for this form of my bearing is represented as having its pockets 6' formed practically in reverse direction of the previously described illustrative example because in this form of my invention in assembling the device the operator takes the cage 5' passes it within one of the lands 10' centers it and snaps the rollers 7' through the narrower or inwardly directed openings of the pockets. In this case as in the other, the rollers pass into the median portion of the pockets and permit the cage parts to recover from the temporary deformation. The reference characters 11 to 19 which have been described in connection with Figures 1 and 2 are primed in referring to this construction.

Of course it is to be understood that various changes may be made within the scope of the claims without departing from the spirit of my invention.

Having thus described my invention, I claim and desire to secure by Letters Patent:

1. In a roller bearing unit assembly, the combination with a series of rollers, of a bearing ring formed with a roller raceway surface disposed between roller-end engaging members, and a cage composed of non-malleable material and shaped to freely pass over such members, and having a series of roller pockets, each of such pockets being formed with roller-end engaging faces and plane roller-side engaging faces flaring apart toward the said raceway surface and converging toward one another at the opposite portion of the cage, there forming a mouth slightly less in width than the normal diameter of the roller, and also forming holding-in portions inwardly of the mouth, whereby the roller may be pressed into the pocket through the mouth thereof and thence freely pass inwardly beyond the holding-in portions thereof and between the roller-end engaging members of the bearing ring.

2. In a roller bearing unit assembly, the combination with a series of rollers, of a bearing ring formed with a roller raceway surface disposed between lands formed with roller-end engaging shoulders, and a cage composed of non-malleable material and shaped to freely pass over such lands, and having a series of roller pockets, each of such pockets being formed with roller-end engaging faces and plane roller-side engaging faces flaring apart toward the said raceway surface and converging toward one another forming a mouth at the opposite portion of the cage slightly less in width than the normal diameter of the roller, forming holding-in portions, whereby the roller may be pressed into the pocket through the mouth thereof and thence freely pass inwardly beyond the holding-in portions thereof and between the lands of the bearing ring.

3. In a roller bearing unit assembly, the combination with a series of cylindrical rollers, of a bearing ring formed with a cylindrical roller raceway surface disposed between lands formed with roller-end engaging shoulders, and a cage, composed of non-malleable material and shaped to freely pass over such lands, and having a series of roller pockets, each of such pockets being formed with roller-end engaging faces and plane roller-side engaging faces flaring apart toward the said raceway surface and converging toward one another forming a mouth at the opposite portion of the cage slightly less in width than the normal diameter of the roller, forming holding-in portions, whereby the roller may be pressed into the pocket through the mouth thereof and thence freely pass inwardly beyond the holding-in portion thereof and between the lands of the bearing ring.

4. In a roller bearing unit assembly, the combination with a series of cylindrical rollers, of a bearing ring formed with roller-end engaging forces, and a cage composed of non-malleable material and shaped to freely pass over the members, and having a series of roller pockets, each of such pockets being formed with roller-end engaging faces and plane roller-side engaging faces flaring apart toward the said raceway surface and converging toward one another forming a mouth at the opposite portion of the cage slightly less in width than the normal diameter of the roller forming holding-in portions, whereby the roller may be pressed into the pocket through the mouth thereof and thence freely pass inwardly beyond the holding-in portion thereof and between the roller-end engaging members of the bearing ring.

5. In a roller bearing unit assembly, the combination with a series of rollers, of a bearing ring formed upon its interior with a roller raceway surface disposed between inwardly directed members formed with roller-end engaging shoulders and a cage composed of non-malleable material and shaped to freely pass within such members, and having a series of roller pockets, each of such pockets being formed with roller-end engaging faces and plane roller-side engaging faces flaring apart outwardly toward the said raceway surface and converging toward one another forming a mouth at the inner portion of the cage slightly less in width than the normal diameter of the roller forming holding-in portions, whereby the roller may be pressed into the pocket through the mouth thereof and thence freely pass into the pocket beyond the holding-in portions thereof and between the roller end engaging members of the bearing ring.

6. In a roller bearing unit assembly, the combination with a series of rollers, of a bearing ring formed upon its exterior with a roller raceway surface disposed between outwardly directed members formed with roller-end engaging shoulders, and a cage composed of non-malleable material and shaped to freely pass over such members, and having a series of roller pockets, each of such pockets being formed with roller-end engaging faces and plane roller-side engaging faces flaring apart inwardly toward the said raceway surface and converging toward one another forming a mouth at the outer portion of the cage slightly less in width than the normal diameter of the roller forming holding-in portions, whereby the roller may be pressed into the pocket through the mouth thereof and thence freely pass into the pocket beyond the holding-in portions thereof and between the roller end-engaging members of the bearing ring.

ERIC C. BRODIN.